Oct. 25, 1932.  W. M. PERRY  1,884,193
LOW RAIL JOINT RECORDER
Filed March 14, 1930
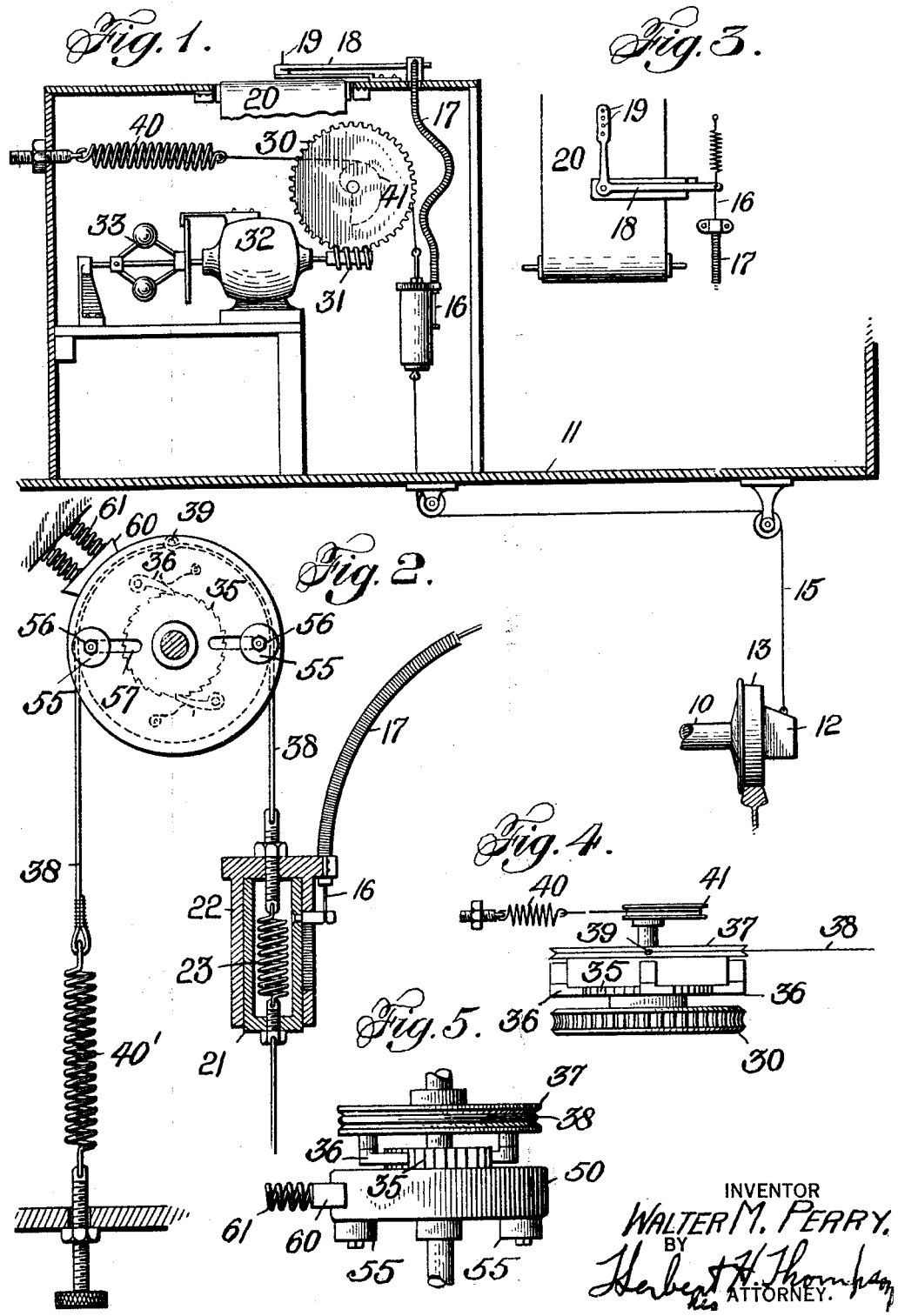
INVENTOR
WALTER M. PERRY.
BY
Herbert H. Thompson
his ATTORNEY.

Patented Oct. 25, 1932

1,884,193

UNITED STATES PATENT OFFICE

WALTER M. PERRY, OF BROOKLYN, NEW YORK, ASSIGNOR, BY MESNE ASSIGNMENTS, TO SPERRY PRODUCTS, INC., OF BROOKLYN, NEW YORK, A CORPORATION OF NEW YORK

LOW RAIL JOINT RECORDER

Application filed March 14, 1930. Serial No. 435,980.

This invention relates to low rail-joint recorders of a type that is applicable to a two-axle truck as well as a three-axle truck. This invention has for its object to provide means for indicating low rail-joints, which shall not be subject to actuation due to movements of the car truck caused by the sway and movement of the car body.

Further objects and advantages of this invention will become apparent in the following detailed description thereof.

In the acompanying drawing,

Fig. 1 is a vertical section through a car body disclosing one form of my invention.

Fig. 2 is a view similar to Fig. 1 but disclosing a modified form of my invention.

Fig. 3 is a plan view of the recording mechanism.

Fig. 4 is a plan view of a portion of the low joint mechanism disclosed in Fig. 1.

Fig. 5 is a plan view of a portion of the Fig. 2 form of the invention.

Referring to Fig. 1 of the drawing, I have shown the axle 10 of a car having a body 11, the said axle having a journal box 12 connected thereto for movement together with said axle and wheel 13 as the said wheel rises and falls in its movement along the rail. The movements of axle 10 and its journal box 12 are designed to be transmitted to a recording mechanism through a cable 15 and Bowden wire and sheath 16—17, the said wire 16 being connected through an operating lever 18 to a pen 19 cooperating with a travelling chart 20. Cable 15 is carried by the car and is movable in response to variations in the rail surface and to movements of the car body with respect to the rail.

The said transmission of vertical movements of axle 10 through the cable 15 and Bowden wire and sheath 16—17 is accomplished in the following manner. Cable 15 is attached to a cylinder 21 operating within a sleeve 22 and connected thereto by means of a spring 23 so that if sleeve 22 is held relatively fixed while cable 15 moves in accordance with the vertical movements of axle 10, spring 23 will be stretched proportionately to permit cylinder 21 to move in sleeve 22 and move Bowden wire 16 connected to the cylinder 21 relative to the sheath 17 connected to the sleeve 22.

As hereinbefore stated, it is one of the objects of my invention to transmit only such movements of cable 15 as are caused by the dropping of the wheel into a rail joint and not to transmit such movements of cable 15 as are due to swaying of the car body. In order to accomplish this object I make use of the fact that the velocity with which the wheel descends into a low rail joint and hence the velocity of downward pull on cable 15 is considerably greater than the downward pull on cable 15 due to the swaying of the car body. I, therefore, provide means whereby the sleeve 22 may move with the cylinder 21 so that no relative motion is transmitted between Bowden wire 16 and its sheath 17 until the velocity of downward pull of cable 15 reaches a predetermined degree. When it reaches this predetermined degree, I provide means for locking or retarding the movement of sleeve 22 with respect to cylinder 21 so that a relative motion between said cylinder and sleeve will take place to actuate the low rail joint recording pen.

This locking device may take either of several forms as illustrated in Figs. 1 and 2 respectively. The form disclosed in Fig. 1 provides for rotating a worm gear 30 by a worm 31 from a motor 32 whose speed may be held constant by some form of governing means 33. Referring to Fig. 4 it will be seen that gear 30 carries on the hub thereof ratchets 35 with which cooperate pawls 36 carried on the hub of a pulley 37 over which extends a cable 38 fastened to the pulley at 39 to prevent slipping, and having one end fastened to the upper end of sleeve 22. The pawls 36 are so disposed that pulley 37 may rotate at a lesser speed than, or equal speed to, gear 30 in the same direction, but as soon as pulley 37 tends to rotate faster than gear 30 pawls 36 engage ratchets 35 to prevent movement of said pulley 37 at a rate faster than the movement of gear 30. It will be understood that if the velocity of downward movement of cable 15 is such as to cause pulley 37 to rotate faster than gear 30, then, since pawl 36 and ratchets 35 prevent such excess speed of pulley 37, something in the line of connection between pulley 37 and cable 15 must give. The yielding part is, of course, the resilient connection 23 between the sleeve 22 which is now held against excess rate of movement and cylinder 21 which is moving rapidly downward with cable 15. Thereupon relative movement between Bowden wire 16 and sheath 17 will take place to actuate the pen 19 on chart 20.

The rate of rotation of gear 30 is made slightly less than the rate of rotation of pulley 37 caused by the downward movement of cable 15 due to a low rail joint of the minimum degree which it is desired to detect and record. Thus it will be seen that downward movement of cable 15 caused by swaying of the car body, which movement imparts a movement to cable 15 less than the velocity imparted thereto by the said minimum rail joint, will permit cylinder 21, sleeve 22, cable 38, and pulley 37 to rotate together as a unit, because the rate of rotation of pulley 37 caused by this movement is less than the rate of rotation of gear 30 and hence pawl 36 can ride idly over the ratchets 35.

A spring connection 40 to the pulley 37 is provided for taking up the slack in the line 38. The cable to the spring 40 is run over a cam 41, so as to give a constant pull, regardless of the degree of extension of the spring. This is necessary because spring 23 is set at a constant initial tension.

A modified form of my invention is disclosed in Fig. 2. The same elements as occur in the Fig. 1 form bear the same numerals and it will be seen that cable 38 again extends over a pulley 37. For locking or retarding the pulley 37 when the downward movement of cable 15 is caused by a low rail joint, that is, when such downward movement exceeds a predetermined velocity, I provide in place of gear 30 driven at a constant speed a flywheel 50 which carries the same ratchets 35, which, in the Fig. 1 form, was carried by the hub of gear 30. Pulley 37 continues to carry the same pawls 36 operating over ratchets 35. In this form of the invention relatively slow downward movement of cable 15, such as that caused by bend of the rail between joints or swaying of the car body will cause pawls 36 engaging ratchets 35 to impress a slow force on the flywheel and set the same in motion so that cable 38 may move downwardly and hence there is no relative movement between sleeve 22 and cylinder 21. When, however, the cable 15 moves downwardly at a relatively rapid rate caused by the wheel dropping into a low rail joint, then the quick pull of cable 15 on the flywheel meets with the inertia resistance of the flywheel so pulley 37, cable 38, and hence lead 22 are retarded and lag behind the downward movement of cylinder 21 and cable 15. This relative motion actuates the recording pen in the same manner as in the Fig. 1 form.

The cable 38, in this case, extends around the pulley 37 and has connected to its outer end a spring 40' for providing the necessary tension. A brake 60, spring-pressed by spring 61 into engagement with the surface of flywheel 50, prevents the building up of rotational velocity of said flywheel due to repeated impulses.

Since the speed with which the wheel drops into a low rail-joint is a function of the speed of the car I may vary the speed of rotation of gear 30, in the Figs. 1 and 4 form of the invention, in proportion to the speed of the car by driving the governor 33 from the car axle. I may obtain the same result in the Figs. 2 and 5 form of the invention by varying the inertia of the flywheel 50 to provide more inertia for slower speeds. For this purpose I have shown weights 55 fixed to bolts projecting through and slidable in slots 57. The weights may be fixed in adjusted position by nuts 56.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a rail joint testing apparatus mounted on a rail car, a member carried by said car and movable in response to variations in the rail surface and to movements of the car body with respect to the rail, a rail joint recorder, a connection between said member and said recorder, said connection including velocity responsive means whereby only those movements of said member in excess of a pre-determined velocity actuate said recorder.

2. In a rail joint testing apparatus mounted on a rail car, a member carried by said car and movable in response to variations in the rail surface and to movements of the car body with respect to the rail, a rail joint recorder, a connection between said member and said recorder, said connection including inertia means, means responsive to the velocities of the movements of said member and means whereby said recorder is actuated only in response to a pre-determined difference in velocities between said inertia means and said responsive means.

3. In a rail joint testing apparatus mounted on a rail car, a member carried by said car and movable in response to variations in the rail surface and to movements of the car body with respect to the rail, a rail joint recorder, a connection between said member and said recorder, said connection including relatively movable members, means whereby relative movement of said members actuates said recorder and means whereby said relative movement is effected only in response to velocities of movements of said first member in excess of a pre-determined velocity.

4. In a rail joint testing apparatus mounted on a rail car, a member carried by said car and movable in response to variations in the rail surface and to movements of the car body with respect to the rail, a rail joint recorder, a connection between said member and said recorder, said connection including relatively movable members, means whereby relative movement of said members actuates said recorder and means whereby said relative movement is effected only in response to velocities of movements of said first member in excess of a pre-determined velocity, said last named means including a connection between said first member and one of said relatively movable members and means for retarding the movement of other of said relatively movable members when said pre-determined velocity is exceeded.

5. In a rail joint testing apparatus mounted on a rail car, a member carried by said car and movable in response to variations in the rail surface and to movements of the car body with respect to the rail, a rail joint recorder a connection between said member and said recorder, said connection including relatively movable and yieldably connected members, means whereby relative movement of said members actuates said recorder and means whereby said relative movement is effected only in response to velocities of movements of said first member in excess of a pre-determined velocity, said last named means including a connection between said first member and one of said relatively movable members, an inertia member, means connected to said other relatively movable member and co-operating with said inertia member, and means for locking said last named means to said inertia member when said pre-determined velocity is exceeded.

6. In a rail joint testing apparatus mounted on a rail car, a member carried by said car and movable in response to variations in the rail surface and to movements of the car body with respect to the rail, a rail joint recorder, a connection between said member and said recorder, said connection including relatively movable and yieldably connected members, means whereby relative movement of said members actuates said recorder and means whereby said relative movement is effected only in response to velocities of movements of said first member in excess of a pre-determined velocity, said last named means including a connection between said first member and one of said relatively movable members, an inertia member, means for rotating said inertia member at a constant rate less than said pre-determined velocity, means connected to said other relatively movable member and co-operating with said inertia member and means for locking said first named means to said inertia member when said pre-determined velocity is exceeded.

7. In a rail joint testing apparatus mounted on a rail car, a member carried by said car and movable in response to variations in the rail surface and to movements of the car body with respect to the rail, a rail joint recorder, a connection between said member and said recorder, said connection including relatively movable and yieldably connected members, means whereby relative movement of said members actuates said recorder and means whereby said relative movement is effected only in response to velocities of movements of said first member in excess of a pre-determined velocity, said last named means including a connection between said first member and one of said relatively movable members, an inertia member, means for rotating said inertia member at a constant rate less than said pre-determined velocity, a rotary member connected to said other relatively movable member and a one-way connection between said rotary member and said inertia member for locking the same together when said pre-determined velocity is exceeded.

8. In a rail joint testing apparatus mounted on a rail car, a member carried by said car and movable in response to variations in the rail surface and to movements of the car body with respect to the rail, a rail joint recorder, a connection between said member and said recorder, said connection including relatively movable and yieldably connected members, means whereby relative movement of said members actuates said recorder and means whereby said relative movement is effected only in response to velocities of movements of said first member in excess of a pre-determined velocity, said last named means including a connection between said first member and one of said relatively movable members, an inertia member, a rotary member connected to said other relatively movable member and a one-way connection between said rotary member and said inertia member for locking the same together.

In testimony whereof I have affixed my signature.

WALTER M. PERRY.